United States Patent
Jeon

(10) Patent No.: US 10,731,767 B2
(45) Date of Patent: Aug. 4, 2020

(54) CHECK VALVE

(71) Applicant: MANDO CORPORATION, Pyeongtaek-si, Gyeonggi-do (KR)

(72) Inventor: In Wook Jeon, Seoul (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/058,385

(22) Filed: Aug. 8, 2018

(65) Prior Publication Data
US 2019/0049025 A1    Feb. 14, 2019

(30) Foreign Application Priority Data
Aug. 8, 2017  (KR) .................. 10-2017-0100088

(51) Int. Cl.
*F16K 15/04* (2006.01)
*B60T 1/00* (2006.01)
*F16K 11/10* (2006.01)

(52) U.S. Cl.
CPC ............. *F16K 15/042* (2013.01); *B60T 1/00* (2013.01); *F16K 11/105* (2013.01); *Y10T 137/2567* (2015.04)

(58) Field of Classification Search
CPC ......... Y10T 137/2567; Y10T 137/7845; F16K 15/042; F16K 11/105; B60T 1/00; B60T 15/02; F16D 65/14; F16D 2121/02
USPC ............................ 137/112, 512.5
See application file for complete search history.

(56) References Cited

U.S. PATENT DOCUMENTS

| | | | | |
|---|---|---|---|---|
| 730,085 A | * | 6/1903 | Berg | F16K 11/044 137/112 |
| 2,311,851 A | * | 2/1943 | McClure | F16K 15/025 137/113 |
| 2,634,743 A | * | 4/1953 | Audemar | F15B 7/003 137/112 |
| 2,680,016 A | * | 6/1954 | McLeod | E05F 15/57 60/460 |
| 2,761,463 A | * | 9/1956 | Wagner | F16K 15/028 137/112 |
| 2,764,175 A | * | 9/1956 | Mercier | F16K 17/00 137/109 |
| 2,809,659 A | * | 10/1957 | Gillespie | F16K 17/196 137/512 |
| 3,038,487 A | * | 6/1962 | Gardner | F16K 11/044 137/112 |

(Continued)

*Primary Examiner* — William M McCalister
(74) *Attorney, Agent, or Firm* — Morgan, Lewis & Bockius LLP

(57) ABSTRACT

A check valve is disclosed. The check valve, which is installed in a modulator block of a brake system having a flow path forming a hydraulic circuit, may include: a sleeve housing whose both ends open, the sleeve housing having a discharge flow path, wherein at least one outlet is formed in the discharge flow path; a pair of adaptors respectively coupled with both open ends of the sleeve housing, wherein in one end of each adaptor, an inlet connected to a flow path of the modulator block is formed, and in the other end of the adaptor, a valve seat connected to the discharge flow path is formed; an elastic member disposed in the discharge flow path; and a pair of opening and closing members respectively supported on both ends of the elastic member, and disposed to selectively contact each valve seat of the pair of adaptors.

9 Claims, 5 Drawing Sheets

(56) References Cited

U.S. PATENT DOCUMENTS

| | | | | |
|---|---|---|---|---|
| 3,107,681 | A | * | 10/1963 | May ........................ B60T 17/18 137/112 |
| 3,433,241 | A | * | 3/1969 | Kantz ...................... F15B 13/00 137/112 |
| 4,121,601 | A | * | 10/1978 | Presley ................... B60K 17/10 137/101 |
| 4,261,381 | A | * | 4/1981 | Geiling ................. B60G 17/033 137/101 |
| 4,368,752 | A | * | 1/1983 | Tamamori ............. F16K 11/105 137/112 |
| 4,463,775 | A | * | 8/1984 | Wittren ................... B62D 5/09 137/111 |
| 4,827,972 | A | * | 5/1989 | Graham ................ F16K 11/105 137/512 |
| 5,183,075 | A | * | 2/1993 | Stein .................... F02M 59/462 137/493.6 |
| 6,675,823 | B2 | * | 1/2004 | Guo ........................ F04C 14/26 137/115.04 |
| 8,113,226 | B2 | * | 2/2012 | Zweber ................ F16K 11/105 137/112 |
| 8,171,951 | B2 | * | 5/2012 | Quendt ................ F16K 11/044 137/111 |
| 2008/0041452 | A1 | * | 2/2008 | Zweber ................ F16K 11/105 137/12 |
| 2012/0011997 | A1 | * | 1/2012 | Stephenson ............. F04B 49/22 91/468 |
| 2018/0023717 | A1 | * | 1/2018 | Summers .............. F16K 11/044 137/15.18 |

\* cited by examiner

[FIG. 1]
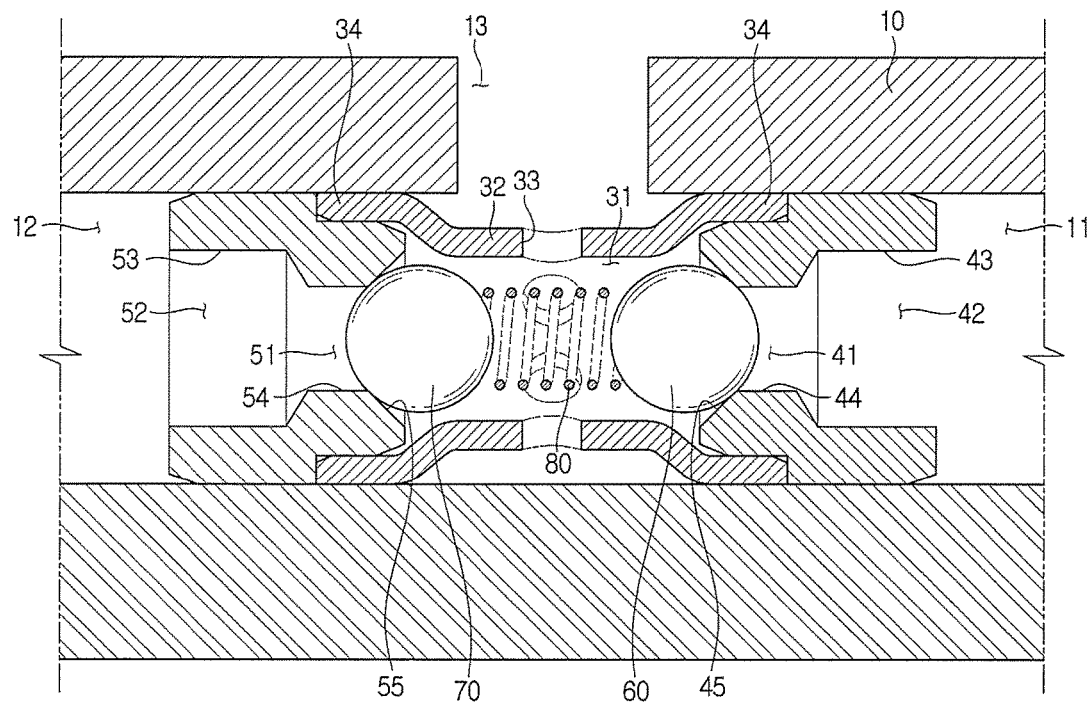

[FIG. 2]
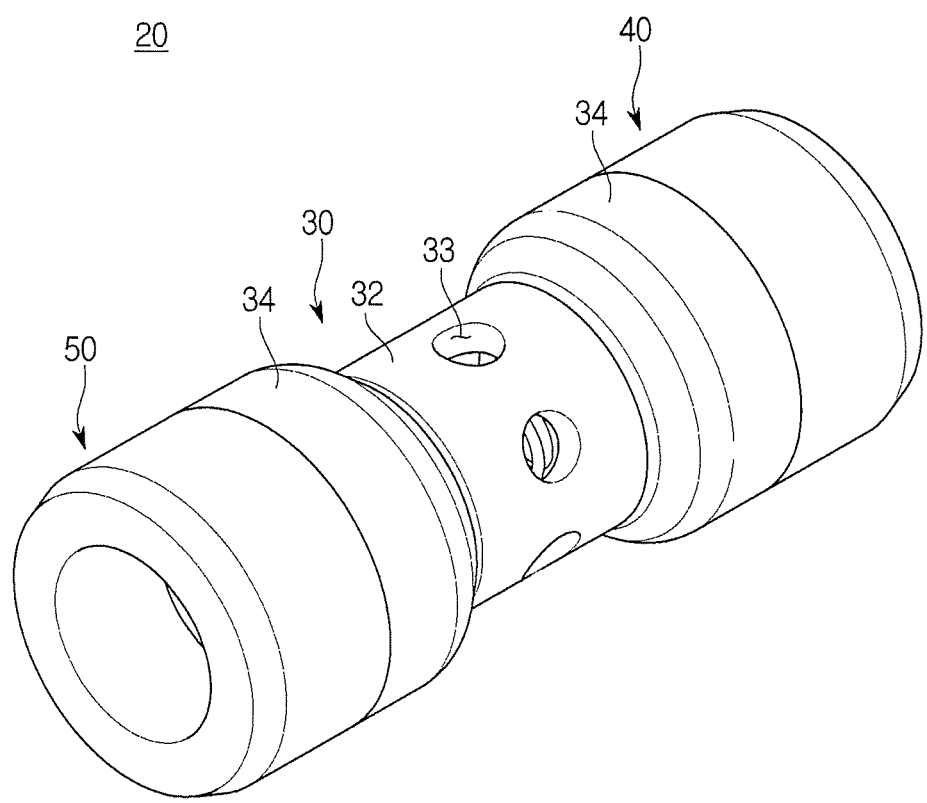

[FIG. 3]
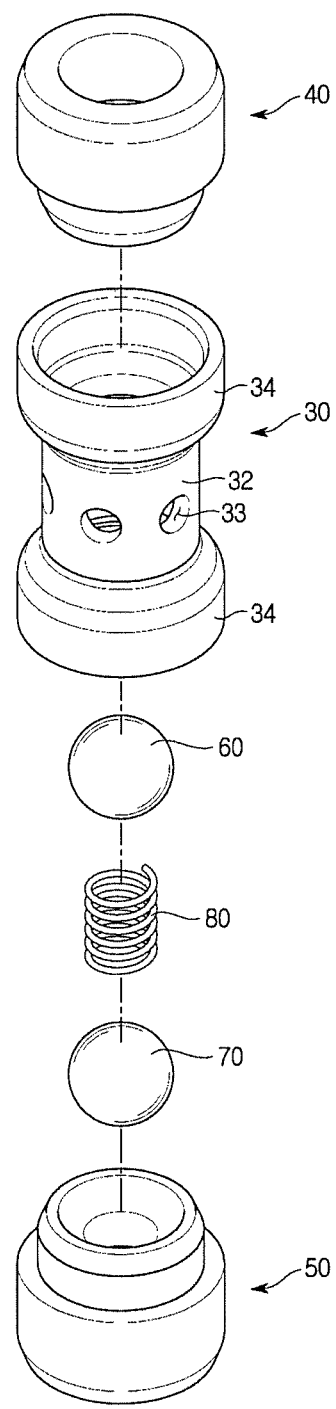

[FIG. 4]
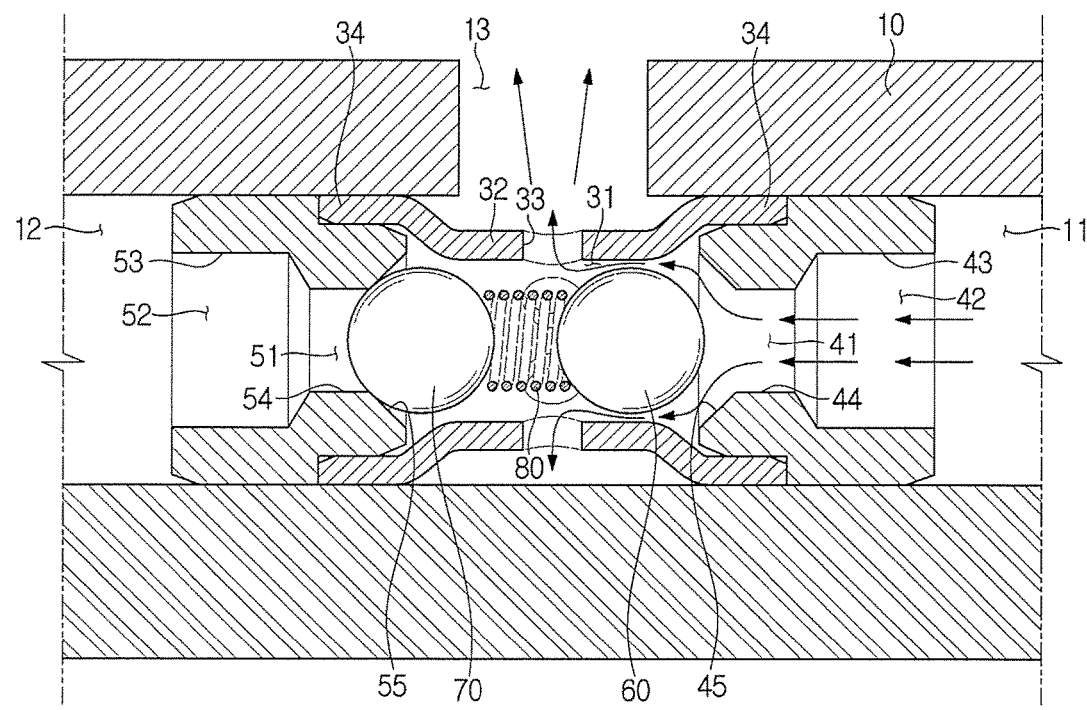

[FIG. 5]
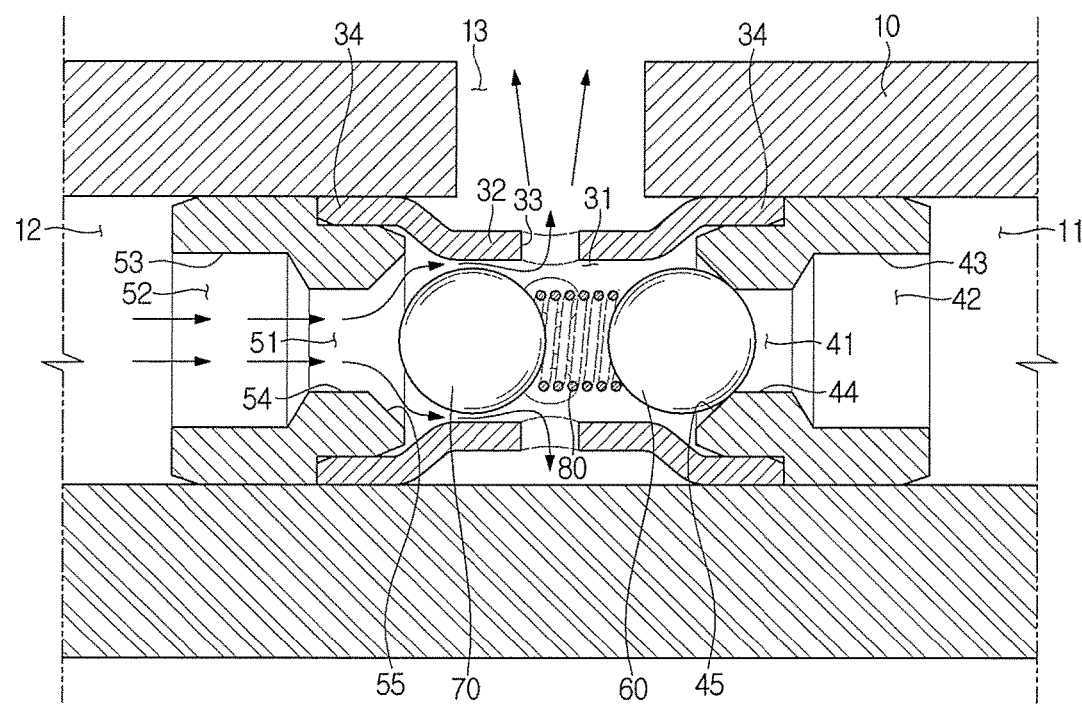

CHECK VALVE

CROSS-REFERENCE TO RELATED APPLICATION

This application is based on and claims priority under 35 U.S.C. § 119 to Korean Patent Application No. 10-2017-0100088, filed on Aug. 8, 2017, in the Korean Intellectual Property Office, the disclosure of which is incorporated by reference herein in its entirety.

BACKGROUND

1. Field

The present disclosure relates to a check valve, and more particularly, to a check valve installed in a modulator block of a brake system.

2. Description of the Related Art

In general, a brake system functions to efficiently prevent wheel slipping that may occur upon a vehicle's braking, sudden unintended acceleration, or sudden acceleration. The brake system is installed in a modulator block having flow paths in which a plurality of solenoid valves for controlling a braking pressure transferred from a master cylinder to a wheel cylinder and a plurality of check valves for preventing the reverse flow of oil form hydraulic circuits, thereby controlling the braking pressure. Recently, an electronic brake system including a hydraulic feeding device for receiving, when a driver presses the brake pedal, the driver's braking intention as an electrical signal from a pedal displacement sensor sensing a displacement of the brake pedal to supply a pressure to the wheel cylinder is widely used. A structure of the electronic brake system is disclosed in Korean Laid-open Patent Application No. 10-2013-0092045. According to the disclosed document, an electronic brake system including a hydraulic feeding device operates a motor according to a brake pedal effort to generate a braking pressure, wherein the braking pressure is generated by converting the torque of the motor into a linear motion to press a piston.

On the flow paths formed in the modulator block, the check valves are installed at proper locations to control the flow direction of oil. For example, the check valves are installed on a flow path connecting a pressure supply apparatus to a reservoir, a flow path connected to the admission valve of each hydraulic circuit, etc.

PRIOR ART DOCUMENT

Korean Laid-open Patent Application No. 10-2013-0092045 (Laid-open on Aug. 20, 2013)

SUMMARY

Embodiments of the present disclosure provide a check valve capable of configuring a three-way flow path in a modulator block of a brake system through a simple structure.

Additional aspects of the disclosure will be set forth in part in the description which follows and, in part, will be obvious from the description, or may be learned by practice of the disclosure.

It is an aspect of the present disclosure to provide a check valve installed in a modulator block of a brake system having a flow path forming a hydraulic circuit, the check valve including: a sleeve housing whose both ends open, the sleeve housing having a discharge flow path, wherein at least one outlet is formed in the discharge flow path; a pair of adaptors respectively coupled with both open ends of the sleeve housing, wherein in one end of each adaptor, an inlet connected to a flow path of the modulator block is formed, and in the other end of the adaptor, a valve seat connected to the discharge flow path is formed; an elastic member disposed in the discharge flow path; and a pair of opening and closing members respectively supported on both ends of the elastic member, and disposed to selectively contact each valve seat of the pair of adaptors.

Also, the pair of opening and closing members may be ball members.

Also, the elastic member may include a coil spring.

The inlet may include a large diameter portion connected to the flow path, and a small diameter portion in which the valve seat is formed and which forms an orifice communicating with the discharge flow path.

Also, the inlet and the discharge flow path may be aligned.

Also, the sleeve housing may be in the shape of a hollow cylinder, and the at least one outlet may be arranged at predetermined intervals along an outer circumference of the sleeve housing.

The pair of adaptors may, be pressed in both ends of the sleeve housing.

The sleeve housing may include a body in which the at least one outlet is formed, and a pair of coupling portions formed at both ends of the body and having a relatively larger diameter than a diameter of the body, wherein the pair of adaptors are respectively pressed in the pair of coupling portions.

It is another aspect of the present disclosure to provide a check valve installed in a modulator block of a brake system having a flow path forming a hydraulic circuit, the check valve including a pair of opening and closing members configured to selectively open and close a pair of orifices communicating a pair of inlets connected to a flow path of the hydraulic circuit with a discharge flow path located between the pair of inlets, wherein the pair of opening and closing members are elastically supported on both ends of a coil spring to close the corresponding orifices, move by a pressure of oil entered through the corresponding inlets to open the corresponding orifices, and close the corresponding orifices by an elastic force of the coil spring when the pressure of the oil is removed.

It is another aspect of the present disclosure to provide a check valve including: a sleeve housing having a body whose both ends open, the body having a hollow discharge flow path, wherein at least one outlet is formed along an outer circumference of the body; a pair of adaptors coupled with both open ends of the sleeve housing, each of the pair of adaptors having an inlet through which oil enters and an orifice communicating with the discharge flow path; and a pair of opening and closing members respectively supported on both ends of the elastic member accommodated in the inside of the body, and configured to selectively open and close each orifice of the pair of adaptors.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a cross-sectional view schematically showing a state in which a check valve is installed in a modulator block according to an embodiment of the present disclosure;

FIG. 2 is a perspective view of a check valve according to an embodiment of the present disclosure;

FIG. 3 is an exploded perspective view of a check valve according to an embodiment of the present disclosure; and FIGS. 4 and 5 are views for describing an operation of a check valve according to an embodiment of the present disclosure.

DETAILED DESCRIPTION

Hereinafter, embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes, lengths, thicknesses, etc. of components are more or less exaggeratedly shown. Throughout this specification, like reference numerals will refer to like components.

FIG. 1 is a cross-sectional view schematically showing a state in which a check valve is installed in a modulator block according to an embodiment of the present disclosure, FIG. 2 is a perspective view of a check valve according to an embodiment of the present disclosure, and FIG. 3 is an exploded perspective view of a check valve according to an embodiment of the present disclosure.

Referring to FIGS. 1 to 3, a check valve 20 according to an embodiment of the present disclosure may overcome installation space shortage that is caused when two typical one-way check valves are used to configure a three-way flow path in a modulator block 10, and may have a simple structure to prevent cost rise due to a large number of parts.

The check valve 20 may have a structure in which a pair of adaptors 40 and 50 are coupled with both open ends of a sleeve housing 30, and in the inside of the sleeve housing 30, an elastic member 80 may be disposed to elastically support a pair of opening and closing members 60 and 70 for selectively opening and closing orifices 41 and 51.

The sleeve housing 30 may be in the shape of a hollow cylinder whose both ends open, and in the inside of the sleeve housing 30, a hollow discharge flow path 31 may be formed.

The sleeve housing 30 may be molded through press processing, and include a body 32 having the discharge flow path 31 therein. In the body 32, at least one outlet 33 may be formed to discharge oil entered the discharge flow path 31.

The at least one outlet 33 may be arranged at predetermined intervals along an outer circumference of the body 32.

At both ends of the sleeve housing 30, that is, at both ends of the body 32, a pair of coupling portions 34 having a relatively larger diameter than that of the body 32 may be formed in the shape of a flange.

The adaptors 40 and 50 may be pressed in the coupling portions 34 formed at both ends of the sleeve housing 30.

The adaptors 40 and 50 may be configured with large diameter portions 43 and 53 in which inlets 42 and 52 are formed to communicate with inlet flow paths 11 and 12 of the modulator block 10, and small diameter portions 44 and 54 forming the orifices 41 and 51 which communicate with the discharge flow path 31 formed in the inside of the body 32.

The small diameter portions 44 and 54 may be pressed in the coupling portions 34 at the outer surfaces. At ends of the small diameter portions 44 and 54 toward the discharge flow path 31, valve seats 45 and 55 may be formed in such a way to contact the opening and closing members 60 and 70 for selectively opening and closing the orifices 41 and 51.

The opening and closing members 60 and 70 may be ball members, and the valve seats 45 and 55 may be in the shape of a cone to stably rest the opening and closing members 60 and 70 which are ball members.

The opening and closing members 60 and 70 may be provided as a pair of pieces to contact the respective valve seats 45 and 55 of the pair of adaptors 40 and 50 coupled with both ends of the check valve 20. The pair of opening and closing members 60 and 70 may be supported on both ends of the elastic member 80 disposed in the inside of the discharge flow path 31.

The elastic member 80 may be a coil spring, and the pair of opening and closing members 60 and 70 supported on both ends of the elastic member 80 may be elastically pressed in a direction of blocking the corresponding valve seats 45 and 55.

That is, the pair of opening and closing members 60 and 70 may be elastically supported on both ends of the elastic member 80 to close the corresponding orifices 41 and 51. The pair of opening and closing members 60 and 70 may move by a pressure of oil entered through the corresponding inlets 42 and 52 to open the corresponding orifices 41 and 51, and when the pressure of the oil entered through the inlets 42 and 52 is removed, the pair of opening and closing members 60 and 70 may close the corresponding orifices 41 and 51 by the elastic force of the elastic member 80. When the pair of pair of opening and closing members 60 and 70 move to open the orifices 41 and 51, the pair of pair of opening and closing members 60 and 70 may be guided by an inner wall of the sleeve housing 30 to stably perform a linear motion, resulting in excellent responsiveness.

Hereinafter, an operation of the check valve according to an embodiment of the present disclosure will be described with reference to FIGS. 4 and 5.

Referring first to FIG. 4, in the structure in which the check valve 20 according to an embodiment of the present disclosure is installed in the modulator block 10, oil may enter the inlet 42 through the right inlet flow path 11, and when a pressure of the oil is greater than the elastic force of the elastic member 80, the right opening and closing member 60 may move to open the right orifice 41, and the oil entered the outlet flow path 31 through the right orifice 41 may be discharged to the discharge flow path 13 through the outlet 33.

Thereafter, when the pressure of the oil becomes smaller than the elastic force of the elastic member 80, the right opening and closing member 60 may move in a direction of sealing up the orifice 41 by the elastic force of the elastic member 80 to close the orifice 41.

In contrast, when oil enters the inlet 52 through the left inlet flow path 12, and a pressure of the oil is greater than the elastic force of the elastic member 80, as shown in FIG. 5, the left opening and closing member 70 may move to open the left orifice 51, and the oil entered the discharge flow path 31 through the left orifice 51 may be discharged to the discharge flow path 13 through the outlet 33.

Thereafter, when the pressure of the oil becomes smaller than the elastic force of the elastic member 80, the left opening and closing member 70 may move in a direction of sealing up the orifice 51 by the elastic force of the elastic member 80 to close the orifice 51.

Through this structure, by configuring two one-way check valves as a single module when two-way flows are required to configure a hydraulic circuit of a modulator block, it may be unnecessary to form a separate flow path for installing two check valves in the modulator block, resulting in a reduction of manufacturing cost, and compactification of the modulator block according to spatial efficiency, which leads to high market competitiveness.

According to the embodiments of the present disclosure, by configuring a three-way flow path in a modulator block of a brake system through a simple structure, it may be possible to prevent cost rise due to a large number of parts and to overcome installation space shortage of a check valve in the modulator block, thereby improving design freedom of the modulator block through space security.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A check valve fixedly disposed in a modulator block of a brake system having a flow path defining a hydraulic circuit and configured to define a three-way flow path in the modulator block, the check valve comprising:
    a sleeve housing whose both ends are open, the sleeve housing having a discharge flow path, wherein at least one outlet is defined in the discharge flow path;
    a pair of adaptors respectively coupled with both open ends of the sleeve housing, wherein in a first end of each adaptor, an inlet connected to a flow path of the modulator block is defined, and in a second end of each adaptor, a valve seat connected to the discharge flow path is defined;
    an elastic member disposed in the discharge flow path; and
    a pair of opening and closing members respectively supported on both ends of the elastic member, and disposed to selectively contact each valve seat of the pair of adaptors,
    wherein each adaptor includes:
        a large diameter portion at an inlet side; and
        a small diameter portion, which has an inner diameter smaller than an inner diameter of the large diameter portion, defining an orifice that communicates with the discharge flow path at a valve seat side, and
    wherein the pair of adaptors are arranged to fix a position of the sleeve housing in the moddulator block.

2. The cheek valve of claim 1, wherein the pair of opening and closing members are ball members.

3. The check valve of claim 1, wherein the elastic member includes a coil spring.

4. The check valve of claim 1, wherein the inlet of each of the pair of adaptors and the discharge flow path are aligned.

5. The check valve of claim 4, wherein the sleeve housing has a hollow cylinder shape, and wherein the at least one outlet includes a plurality of outlets which are arranged at predetermined intervals along an outer circumference of the sleeve housing.

6. The check valve of claim 5, wherein the pair of adaptors are press-fitted in both ends of the sleeve housing.

7. The check valve of claim 6, wherein the sleeve housing comprises:
    a body having the at least one outlet therein; and
    a pair of coupling portions at respective ends of the body, each of the pair of coupling portions having an inner diameter larger than an inner diameter of the body,
    wherein the pair of adaptors are respectively press-fitted in the pair of coupling portions.

8. A check valve fixedly disposed in a modulator block of a brake system having a flow path defining a hydraulic circuit and configured to define a three-way flow path in the modulator block, the check valve comprising,
    a pair of opening and closing members configured to selectively open and close a pair of axially opposing orifices respectively communicating with a pair of inlets disposed in corresponding adaptors connected to a flow path of the hydraulic circuit with a discharge flow path located between the pair of inlets,
    wherein the pair of opening and closing members are elastically supported on both ends of a coil spring to close the corresponding orifices, move by a pressure of oil entered through the corresponding inlets to open the corresponding orifices, and close the corresponding orifices by an elastic force of the coil spring when the pressure of the oil is removed,
    wherein the pair of axially opposing orifices define a sleeve housing fixedly disposed in the modular block by the adapters, and
    wherein the pair of inlets respectively have inner diameters larger than corresponding inner diameters of the pair of orifices.

9. A check valve comprising:
    a sleeve housing having a body whose both axially opposing ends are open, the body having a hollow discharge flow path with the axially opposing open ends providing a corresponding inlet to the discharge flow path, wherein at least one outlet is defined along an outer circumference of the body;
    a pair of adaptors coupled with both open ends of the sleeve housing, each of the pair of adaptors having an inlet through which oil enters and an orifice communicating with the discharge flow path; and
    a pair of opening and closing members respectively supported on both ends of the elastic member accommodated in the inside of the body, and configured to selectively open and close each orifice of the pair of adaptors;
    wherein each adapter includes:
        a large diameter portion at an inlet side; and
        a small diameter portion, which has an inner diameter smaller than an inner diameter of the large diameter portion, defining an orifice that communicates with the discharge flow path at a valve seat,
    wherein the pair of adapters are configured to fix a position of the sleeve housing in a modulator block.

* * * * *